United States Patent
Chun et al.

(10) Patent No.: US 8,593,555 B1
(45) Date of Patent: Nov. 26, 2013

(54) DIGITAL DEVICE AND METHOD FOR CONTROLLING THE SAME

(71) Applicant: LG Electronics Inc., Seoul (KR)

(72) Inventors: Sinae Chun, Seoul (KR); Jihwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/856,310

(22) Filed: Apr. 3, 2013

(30) Foreign Application Priority Data

Feb. 28, 2013 (KR) .................. 10-2013-0022053

(51) Int. Cl.
*H04N 5/222* (2006.01)
(52) U.S. Cl.
USPC .................................................... 348/333.01
(58) Field of Classification Search
USPC ............... 348/239, 333.01, 333.02, 333.05, 348/333.11
See application file for complete search history.

(56) References Cited

U.S. PATENT DOCUMENTS

| | | | |
|---|---|---|---|
| 5,111,228 A | | 5/1992 | Hansen |
| 6,778,217 B1 * | | 8/2004 | Nishimura ............... 348/333.12 |
| 6,839,452 B1 * | | 1/2005 | Yang et al. .................... 382/103 |
| 7,054,552 B2 | | 5/2006 | Konttinen |
| 7,551,223 B2 * | | 6/2009 | Tanaka ........................ 348/346 |
| 8,259,208 B2 * | | 9/2012 | Ciurea et al. ............. 348/333.02 |
| 8,416,306 B2 * | | 4/2013 | Yun et al. ................. 348/208.12 |
| 2005/0140813 A1 * | | 6/2005 | Wani ........................ 348/333.12 |
| 2006/0104623 A1 * | | 5/2006 | Sasaki et al. .................. 396/121 |
| 2008/0291284 A1 * | | 11/2008 | Robsarve ................. 348/207.99 |
| 2010/0020221 A1 | | 1/2010 | Tupman et al. |
| 2010/0166404 A1 * | | 7/2010 | Lombardi ........................ 396/89 |
| 2013/0155276 A1 * | | 6/2013 | Ueda ........................ 348/223.1 |

* cited by examiner

*Primary Examiner* — Timothy J Henn
(74) *Attorney, Agent, or Firm* — Birch, Stewart, Kolasch & Birch, LLP

(57) ABSTRACT

The disclosure relates to a digital device and a method for controlling the same, and more particularly, to a digital device for simultaneously capturing a landscape-oriented picture and a portrait-oriented picture and displaying the landscape-oriented picture or the portrait-oriented picture according to the mode of the digital device (landscape mode or portrait mode), and a method for controlling the same.

24 Claims, 19 Drawing Sheets

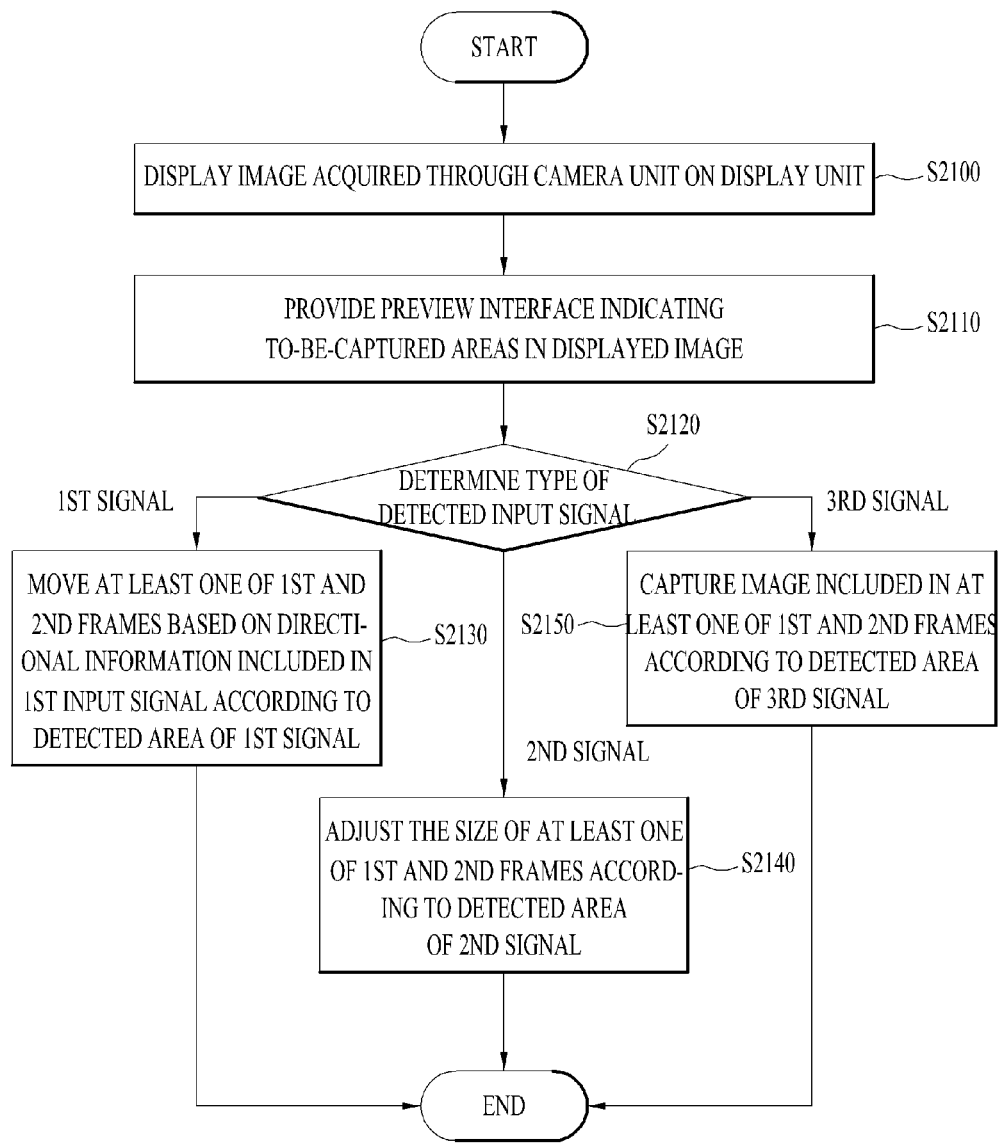

DIGITAL DEVICE AND METHOD FOR CONTROLLING THE SAME

Pursuant to 35 U.S.C. §119(a), this application claims the benefit of Korean Patent Application No. 10-2013-0022053, filed on Feb. 28, 2013, which is hereby incorporated by reference as if fully set forth herein.

BACKGROUND OF THE DISCLOSURE

1. Field of the Disclosure

The disclosure relates to a digital device and a method for controlling the same, and more particularly, to a digital device for simultaneously capturing a landscape-oriented picture and a portrait-oriented picture and displaying the landscape-oriented picture or the portrait-oriented picture according to the mode of the digital device (landscape mode or portrait mode), and a method for controlling the same.

2. Discussion of the Related Art

Along with the development of display technology and image sensing technology, a user can store images in the form of digital data using a digital device. Particularly owing to digital convergence, the digital device can perform various functions, not limited to a specific function.

Therefore, the user can capture an image and view the captured image conveniently at any time in any place by means of various digital devices such as a portable phone, a Personal Digital Assistant (PDA), a laptop computer, a digital camera, etc.

However, to capture a landscape-oriented picture, the user should set the digital device to the landscape mode. Likewise, to capture a portrait-oriented picture, the user should set the digital device to the portrait mode.

That is, when the user wants to capture both a landscape-oriented picture and a portrait-oriented picture in the same direction, the user should inconveniently capture the pictures separately in the landscape mode and the portrait mode.

When the landscape-oriented picture and the portrait-oriented picture are captured in the same direction, the digital device stores images of the landscape-oriented picture and the portrait-oriented picture separately. As a consequence, redundant storing of images of an overlapped area between the landscape-oriented picture and the portrait-oriented picture leads to memory waste.

Moreover, in the case where the digital device captures the same view with landscape orientation and portrait orientation, when the user wants to view a captured picture, the digital device displays a stored picture irrespective of whether it is in the landscape mode or the portrait mode. Therefore, if the picture does not have an aspect ratio approximate to the aspect ratio of the mode of the digital device, the picture is displayed scaled-down.

SUMMARY OF THE DISCLOSURE

Accordingly, the disclosure is directed to a digital device and a method for controlling the same that substantially obviate one or more problems due to limitations and disadvantages of the related art.

An embodiment provides a digital device for simultaneously capturing a landscape-oriented picture and a portrait-oriented picture in response to one user input and a method for controlling the same.

Another embodiment provides a preview interface indicating to-be-captured areas so that a user can readily capture a landscape-oriented picture and a portrait-oriented picture.

Another embodiment provides a digital device for, when a landscape-oriented picture and a portrait-oriented picture are simultaneously captured, storing an image of the same area appearing commonly in the landscape-oriented picture and the portrait-oriented picture once without redundancy, and a method for controlling the same.

Another embodiment provides a digital device for, when a landscape-oriented picture and a portrait-oriented picture are simultaneously captured, grouping the landscape-oriented picture and the portrait-oriented picture into one group and storing metadata about the group additionally, and a method for controlling the same.

A further embodiment provides a digital device for displaying a landscape-oriented picture selected from among captured pictures of a group in landscape mode and displaying a portrait-oriented picture selected from among the captured pictures of the group in portrait mode, and a method for controlling the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a digital device includes a sensor unit configured to sense a user input to the digital device and to provide a signal corresponding to a sensed result to a processor, a camera unit configured to acquire an image, a display unit configured to display the acquired image, and the processor configured to control the sensor unit, the camera unit, and the display unit. The processor is further configured to display the image acquired through the camera unit on the display unit, provide a preview interface indicating a to-be-captured area in the displayed image, wherein the preview interface includes a first frame indicating a preview area of a first picture and a second frame indicating a preview area of a second picture, capture an image included in the first frame, when a first input signal to a first area included in the first frame is detected, capture an image included in the second frame, when a second input signal to a second area included in the second frame is detected, simultaneously capture the images included in the first and second frames, when a third input signal to a third area overlapped between the first and second frames is detected, and move at least one of the first and second frames according to a detected area of a fourth input signal, when the fourth input signal is detected.

In another aspect of the disclosure, a method for controlling a digital device includes displaying an image acquired through a camera unit, providing a preview interface indicating a to-be-captured area in the displayed image, wherein the preview interface includes a first frame indicating a preview area of a first picture and a second frame indicating a preview area of a second picture, moving at least one of the first and second frames according to a detected area of a first input signal, when the first input signal is detected, wherein the detected area of the first input signal is one of a first area included in the first frame, a second area included in the second frame, and a third area overlapped between the first and second frames, capturing an image included in the first frame, when a second input signal to the first area is detected, capturing an image included in the second frame, when a third input signal to the second area is detected, and simultaneously capturing the images included in the first and second frames, when a fourth input signal to the third area is detected.

It is to be understood that both the foregoing general description and the following detailed description of the disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate embodiment(s) of the disclosure and together with the description serve to explain the principle of the disclosure. In the drawings:

FIG. 21 is a flowchart illustrating a method for controlling the digital device according to another embodiment.

DETAILED DESCRIPTION OF THE DISCLOSURE

Although the terms used in the disclosure are selected from generally known and used terms, the terms may be changed according to the intention of an operator, customs, or the advent of new technology. Some of the terms mentioned in the description of the disclosure have been selected by the applicant at his or her discretion, the detailed meanings of which are described in relevant parts of the description herein. Therefore, the disclosure must be understood, not simply by the actual terms used but by the meanings of each term lying within.

The embodiments of the disclosure will be described in detail with reference to the attached drawings and a description in the attached drawings, which should not be construed as limiting the disclosure.

Figure 1:
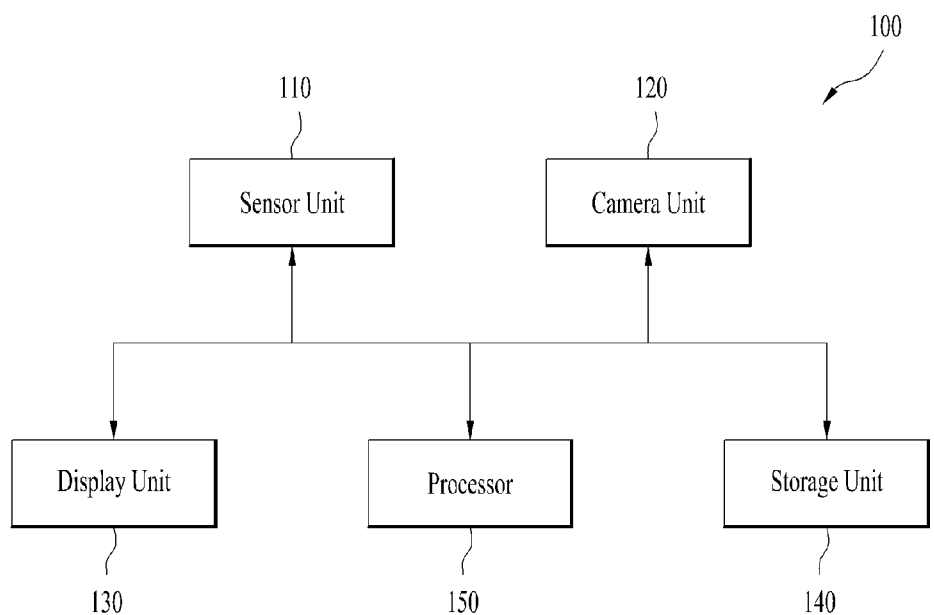
FIG. 1 illustrates an embodiment of a functional block diagram of a digital device.

FIG. 1 illustrates an embodiment of a functional block diagram of a digital device. When needed by those skilled in the art, some component module may be omitted from the digital device or a new component module may be added to the digital device.

Referring to FIG. 1, a digital device 100 according to an embodiment may include a sensor unit 110, a camera unit 120, a display unit 130, a storage unit 140, and a processor 150.

The sensor unit 110 may sense an ambient environment of the digital device 100 using at least one sensor equipped in the digital device 100 and provide a signal corresponding to the sensed result to the processor 150. The sensor unit 110 may also sense a user input and provide an input signal corresponding to the sensed user input to the processor 150.

Therefore, the sensor unit 110 may include at least one sensing means. In an embodiment, the at least one sensing means may include a gravity sensor, a geomagnetic sensor, a motion sensor, a gyro sensor, an acceleration sensor, an infrared sensor, an inclination sensor, an illuminance sensor, an altitude sensor, an odor sensor, a temperature sensor, a depth sensor, a pressure sensor, a bending sensor, an audio sensor, a video sensor, a Global Positioning System (GPS) sensor, a touch sensor, etc.

The sensor unit 110 generically refers to these various sensing means. The sensor unit 110 may sense various user inputs and the environment of the digital device 100 and provide sensed results to the processor 150 so that the processor 150 may perform operations corresponding to the sensed results. The above-described sensors may be included as separate elements or may be incorporated into at least one element in the digital device 100.

The camera unit 120 may acquire an image. Hence, the camera unit 120 may include a lens and an image sensor. The digital device 100 may display an image acquired through the camera unit 120 on the display unit 130 or may store the acquired image in the storage unit 140.

The display unit 130 outputs image data on a display screen. The display unit 130 may output an image according to content or an application executed in the processor 150 or a control command received from the processor 150, or may output an image acquired through the camera unit 120.

If the display unit 130 includes a touch-sensitive display, the display unit 130 may sense a user input such as a touch input.

Accordingly, the processor 150 may generate a control signal using an input signal corresponding to a user input received through the sensor unit 110 or the display unit 130 and may control the digital device 100 by means of the control signal.

In other words, the processor 150 may receive a user input as an input signal through the sensor unit 110 or the display unit 130 and generate a control signal using the input signal.

In addition, the processor 150 may control the component units of the digital device 100 according to control signals.

The following description is given with the appreciation that when each step or operation is initiated or performed by a user input in the digital device, an input signal and a control signal are generated according to the user input in the above manner, and thus a description of the operation for generating an input signal and a control signal according to a user input will not be provided redundantly.

Further, it may be said that the processor controls the digital device or a component unit of the digital device according to a user input and the processor and the digital device may be interchangeably used in the description of the disclosure.

The storage unit 140 may store various digital data including a video, an audio, pictures, applications, etc. The storage unit 140 may include various digital data storage spaces such as a flash memory, a Random Access Memory (RAM), a Solid State Drive (SDD), etc. The storage unit 140 may use buffering to output an image acquired through the camera unit 120.

The storage unit 140 may temporarily store data received from an external device through a communication unit (not shown). The storage unit 140 may use buffering to output the data received from the external device in the digital device 100. The storage unit 140 is optionally provided in the digital device 100.

While not shown in FIG. 1, the digital device 100 may further include a communication unit, an audio Input/Output (I/O) unit, or a power unit.

The communication unit (not shown) may transmit data to or receive data from an external device by communicating with the external device using various protocols. In addition, the communication unit may transmit or receive digital data such as content, applications, etc. over an external network by connecting to the external network wirelessly or by wire.

The audio output unit (not shown) includes audio output means such as a speaker, an earphone, etc. The audio output unit may output voice based on content executed in the processor 150 or a control command received from the processor 150. The audio output unit may be optionally provided in the digital device 100.

The power unit (not shown), which is a power source connected to a battery inside the digital device 100 or an external power source, may supply power to the digital device 100.

The digital device 100 illustrated in FIG. 1 is shown in block form according to an embodiment. Separate blocks are logically distinguished elements in the digital device 100. Therefore, the above-described elements of the digital device 100 may be implemented on one or more chips according to a device design.

Figure 2:
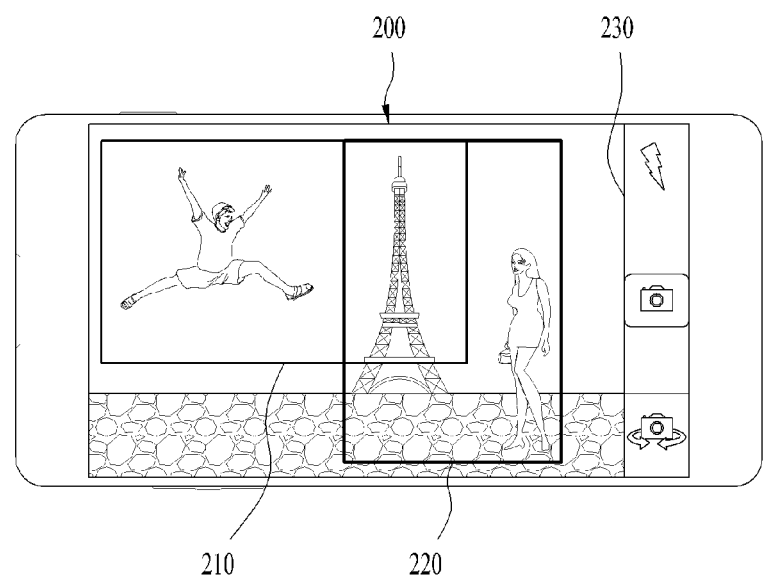
FIG. 2 illustrates an embodiment for providing a preview interface in the digital device.

FIG. 2 illustrates an embodiment for providing a preview interface in the digital device.

In an embodiment, the digital device may display an image acquired through the camera unit on the display unit and provide a preview interface 200 indicating a to-be-captured area of the displayed image.

The preview interface 200 may include a first frame 210 indicating a preview area of a first picture and a second frame 220 indicating a preview area of a second picture.

The first picture may include a landscape-oriented picture and the second picture may include a portrait-oriented picture. Accordingly, a user may directly capture a landscape-oriented picture and a portrait-oriented picture respectively through the first and second frames 210 and 220. This implies that the user may capture an image included in an intended frame 210 or 220 simply by selecting an area included in the intended frame 210 or 220 without the need for rotating the digital device to capture a landscape-oriented picture or a portrait-oriented picture.

In particular, the digital device may simultaneously capture a landscape-oriented picture and a portrait-oriented picture in response to a user input to an area included commonly in the first and second frames 210 and 220 in an embodiment, which will be described later in detail with reference to FIG. 10.

The preview interface 200 may include a control bar 230 with menus for setting attributes for an image to be captured or receiving a capturing input signal. The attributes of an image to be captured may include the brightness and type (e.g. video or still image) of the image. Further, the control bar 230 may include a menu for setting a camera unit (e.g. a front camera unit or a rear camera unit), determining whether to use a flash, etc. The control bar 230 may be displayed without being overlapped with the first and second frames 210 and 220 and may be moved according to a user input.

The digital device may adjust to-be-captured areas by moving the first and second frames 210 and 220 or adjusting the sizes of the first and second frames 210 and 220 in the preview interface 200. The adjustment of to-be-captured areas will be described later with reference to FIGS. 3 to 9.

It will be described as an embodiment that the first frame is shaped into a horizontal rectangle with a latitudinal length greater than a longitudinal length in order to indicate the preview area of a landscape-oriented picture and the second frame is shaped into a vertical rectangle with a longitudinal length greater than a latitudinal length in order to indicate the preview area of a portrait-oriented picture. However, the shapes of the first and second frames are given for illustrative purposes and thus it is to be understood that the first and second frames are not limited to the horizontal and vertical rectangles, respectively.

For the convenience' sake of description, an area included only in the first frame is referred to as a first area, an area included only in the second frame is referred to as a second area, and an area overlapped between the first and second frames is referred to as a third area.

In an embodiment, the digital device may move at least one of the first and second frames 210 and 220 in correspondence with an area in which an input signal is detected. The input signal may be generated by a user's drag input, long-touch and drag input, long-touch and flip input, etc. That is, input signals may be generated by various inputs including a user's touch input, gesture input, etc. Generation of an input signal is not limited to a specific user input and may vary depending on a pre-setting. However, one thing to note herein is that an input signal may include directional data so that the digital device may move a frame according to a user's touch direction or gesture direction.

Figure 3:
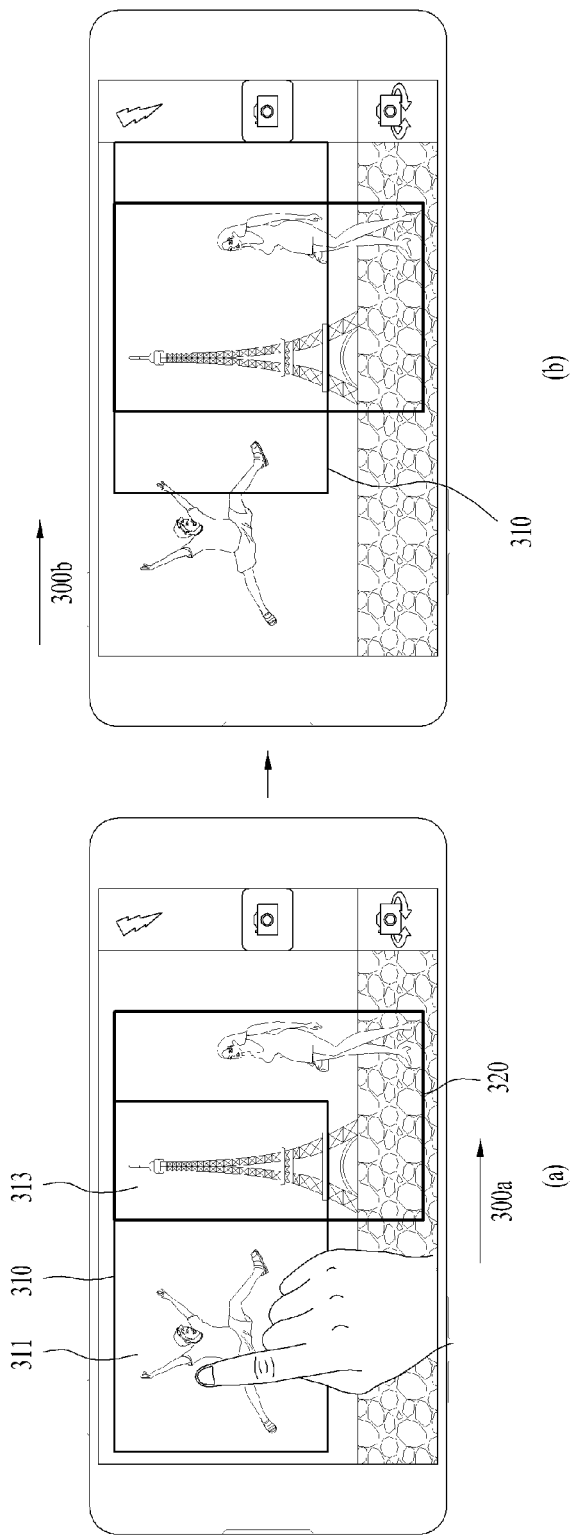
FIG. 3 illustrates an embodiment for moving a first frame in the preview interface.

FIG. 3 illustrates an embodiment for moving the first frame in the preview interface. As illustrated in FIG. 3(a), the digital device may detect an input signal to a first area 311 included in a first frame 310. As illustrated in FIG. 3(b), the digital device may move the first frame 310 according to the detected input signal.

In an embodiment, the digital device may move the first frame 310 to the right 300b in correspondence with a drag direction 300a of a user's touch. Thus, when the user's touch is dragged in a different direction, the first frame 310 may also be moved in a different direction.

As described before, the digital device may sense a hovering input, a gesture input, a long-touch and pinch input, rotation of the digital device, inclination of the digital device, etc. as well as a drag input and may detect a sensed result as an input signal.

Although both areas 311 and 313 are included in the first frame 310, the area 311 is confined to the first frame 310, whereas the area 313 is included commonly in the first and second frames 310 and 320. Upon detection of a user input to the area 311 confined to the first frame 310, the digital device may move only the first frame 310 as illustrated in FIG. 3.

In other words, upon detection of a user input to the common area 313 overlapped between the first and second frames 310 and 320, the digital device may move not only the first frame 310 but also the second frame 320, which will be described later in detail with reference to FIG. 5.

Figure 4:
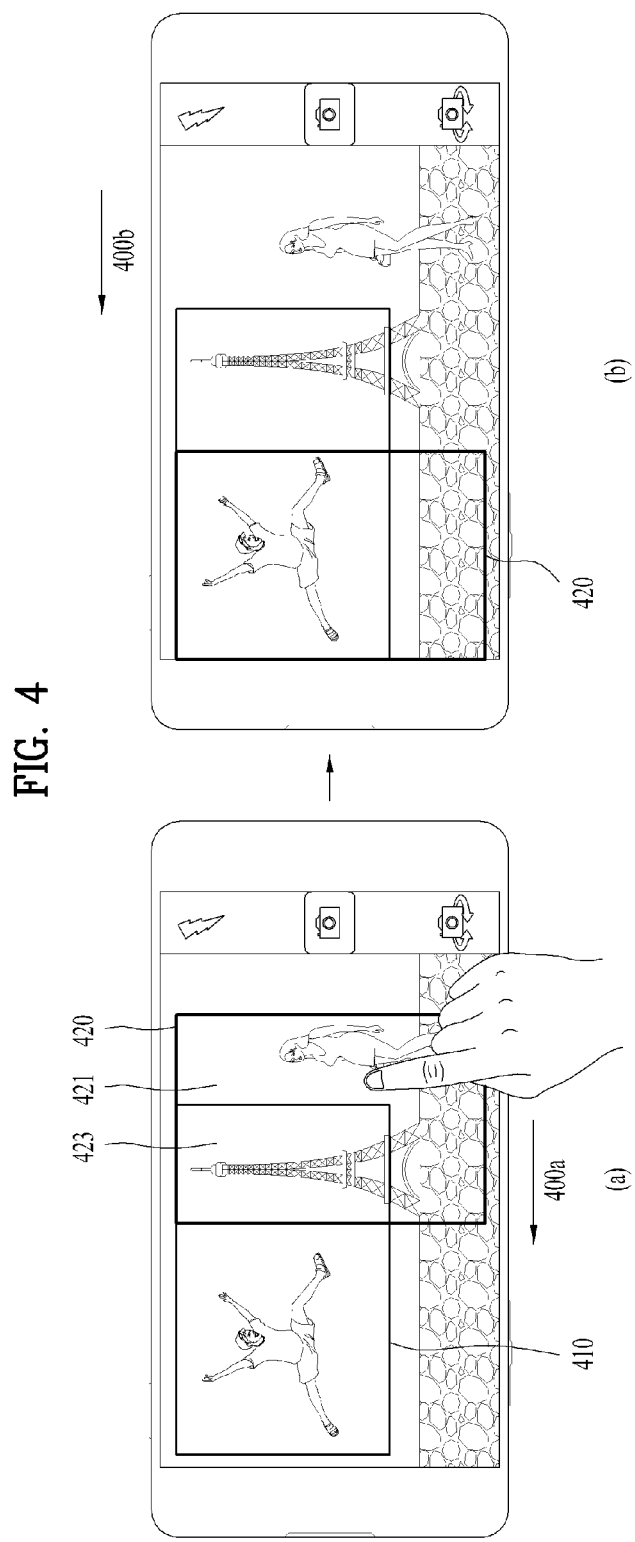
FIG. 4 illustrates an embodiment for moving a second frame in the preview interface.

FIG. 4 illustrates an embodiment for moving the second frame in the preview interface. As illustrated in FIG. 4(a), the digital device may detect an input signal to a second area 421 included in a second frame 420. As illustrated in FIG. 4(b), the digital device may move the second frame 420 to the left 400b in correspondence with a direction 400a of the detected input signal.

When the user's touch is dragged in a different direction, the second frame 420 may also be moved in a different direction. The digital device may sense a hovering input, a long-touch and pinch input, a gesture input, rotation of the digital device, inclination of the digital device, etc. as well as a drag input and may detect a sensed result as an input signal.

Upon detection of an input signal to an area 421 confined to the second frame 420, the digital device may move only the second frame 420. Hence, upon detection of an input signal to a common area 423 overlapped between the first and second frames 410 and 420, the digital device may move not only the first frame 410 but also the second frame 420, which will be described in detail with reference to FIG. 5.

Figure 5:
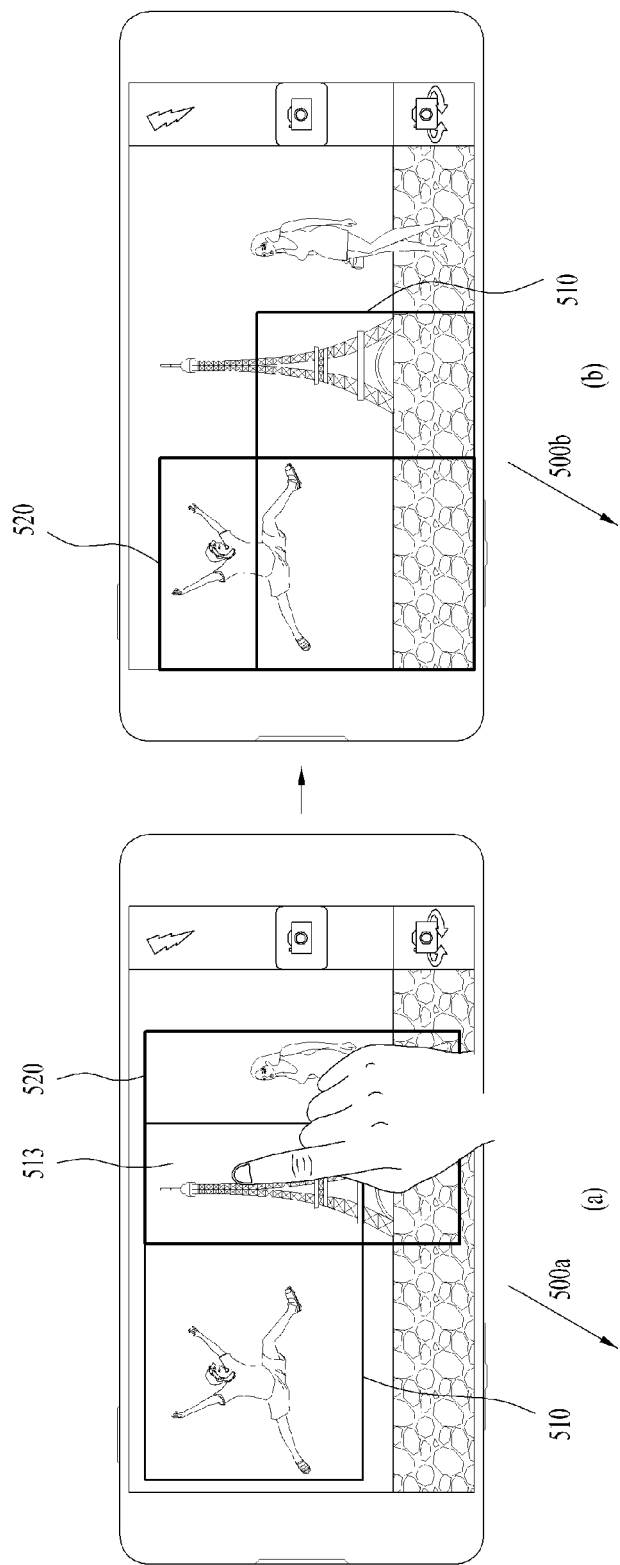
FIG. 5 illustrates an embodiment for simultaneously moving the first and second frames in the preview interface.

FIG. 5 illustrates an embodiment for simultaneously moving the first and second frames in the preview interface. As illustrated in FIG. 5(a), the digital device may detect an input signal to a third area 513 included commonly in first and second frames 510 and 520. The digital device may move the first and second frames 510 and 520 simultaneously in a left downward direction 500b corresponding to a direction 500a of the detected input signal, as illustrated in FIG. 5(b).

If the user's touch is dragged in a different direction, the digital device may change the movement direction of the first and second frames 510 and 520 accordingly. In addition, the digital device may move the first and second frames 510 and 520 in correspondence with many other predetermined user inputs as well as a drag input.

The embodiment of FIG. 5 is different from the embodiments of FIGS. 3 and 4 in that the first and second frames are simultaneously moved in response to one user input. Therefore, the user can move the first and second frames at the same time just with one action.

Figure 6:
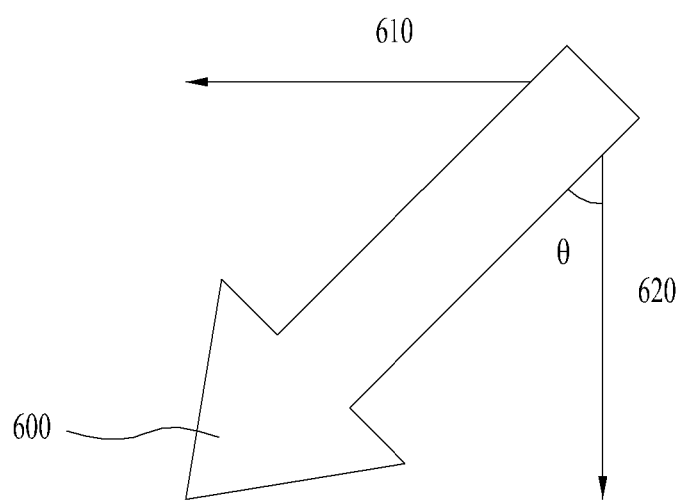
FIG. 6 illustrates an embodiment for determining the movement direction of the first or second frame in the preview interface.

FIG. 6 illustrates an embodiment for determining the movement direction of the first or second frame in the preview interface. In the case where the digital device simultaneously moves the first and second frames in response to one user input as illustrated in FIG. 5, the movement direction of the first and second frames is determined in this embodiment.

It is assumed in FIG. 6 that arrows represent vectors. When the user drags a touch for the length of an arrow 600 in a left downward direction (i.e. the direction of the arrow 600), the digital device may determine movement directions and lengths for the first and second frames by decomposition of the vector represented by the arrow 600.

For example, if the vector 600 corresponding to the user input is at an angle $\theta$ to the Y axis, a first vector 610 may be calculated by multiplying the vector 600 by $\sin \theta$ and a second vector 620 may be calculated by multiplying the vector 600 by $\cos \theta$. That is, the first vector 610 corresponding to the first frame and the second vector 620 corresponding to the second frame may be calculated by decomposition of the vector 600 corresponding to the user input along the X-axis and Y-axis directions.

Therefore, the digital device may move the first frame in the direction corresponding to the first vector 610 for the length corresponding to the first vector 610 and the second frame in the direction corresponding to the second vector 620 for the length corresponding to the second vector 620.

In an embodiment, the digital device may adjust the size of at least one of the first and second frames in correspondence with an area in which an input signal is detected. The input signal may be generated by a pinch-in or punch-out input for zoom-in or zoom-out. The user may apply the pinch-in input and the pinch-out input with two fingers. Or the input signal may be generated by touching the first or second frame and dragging the touch. Embodiments of adjusting the size of a frame according to a user's pinch-in or pinch-out input in the digital device will be described with reference to FIGS. 7, 8 and 9.

Figure 7:
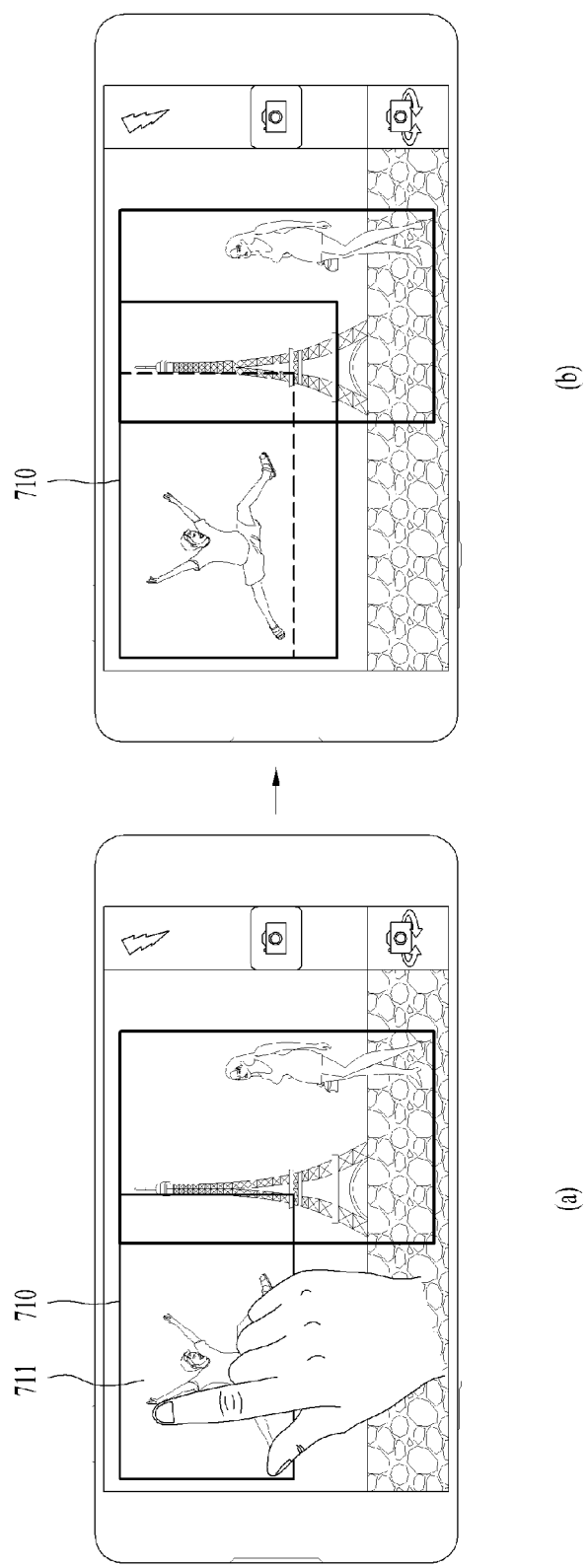
FIG. 7 illustrates an embodiment for adjusting the size of the first frame in the preview interface.

FIG. 7 illustrates an embodiment for adjusting the size of the first frame in the preview interface. As illustrated in FIG. 7(a), the digital device may detect an input signal (e.g. a pinch-out input) to a first area 711 included in a first frame 710. As illustrated in FIG. 7(b), the digital device may enlarge the first frame 710 according to the detected input signal. If the detected input signal has been generated by a user's pinch-in input, the digital device may shrink the first frame 710.

Figure 8:
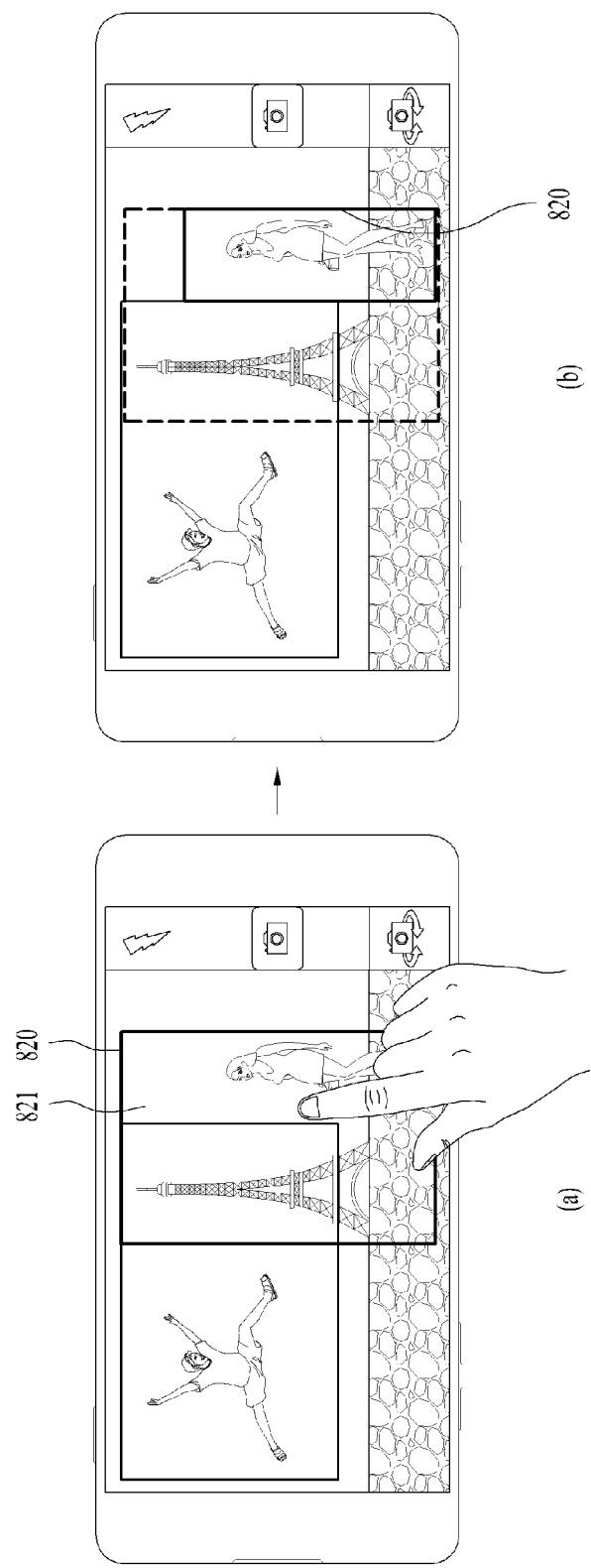
FIG. 8 illustrates an embodiment for adjusting the size of the second frame in the preview interface.

FIG. 8 illustrates an embodiment for adjusting the size of the second frame in the preview interface. As illustrated in FIG. 8(a), the digital device may detect an input signal (e.g. a pinch-in input) to a second area 821 included in a second frame 820. As illustrated in FIG. 8(b), the digital device may shrink the second frame 820 according to the detected input signal.

When the digital device shrinks a frame according to an input signal in the above manner, a third area overlapped between the first and second frames 810 and 820 may be eliminated.

If the detected input signal has been generated from a user's pinch-out input, the digital device may enlarge the second frame 820.

As described above with reference to FIGS. 7 and 8, if the digital device adjusts the sizes of the first and second frames according to a user input, the digital device may maintain the aspect ratios of the first and second frames constant. Accordingly, even though the digital device adjusts the sizes of the first and second frames, the digital device can keep the shapes of captured landscape-oriented and portrait-oriented pictures unchanged.

However, it may occur that the digital device does not maintain the aspect ratios of the first and second frames constant. In this case, the captured pictures may be stored in various shapes such as a square, a rectangle, etc. without a distinction made between a landscape-oriented picture and a portrait-oriented picture.

In the embodiments illustrated in FIGS. 7 and 8, only the size of one of the first and second frames is adjusted according to a user input. Compared to the embodiments illustrated in FIGS. 7 and 8, once the digital device detects an input signal to the area overlapped between the first and second frames, the digital device may adjust the sizes of the first and second frames simultaneously. That is, the digital device may simultaneously adjust the sizes of the first and second frames in response to one user input, which will be described in detail with reference to FIG. 9.

Figure 9:
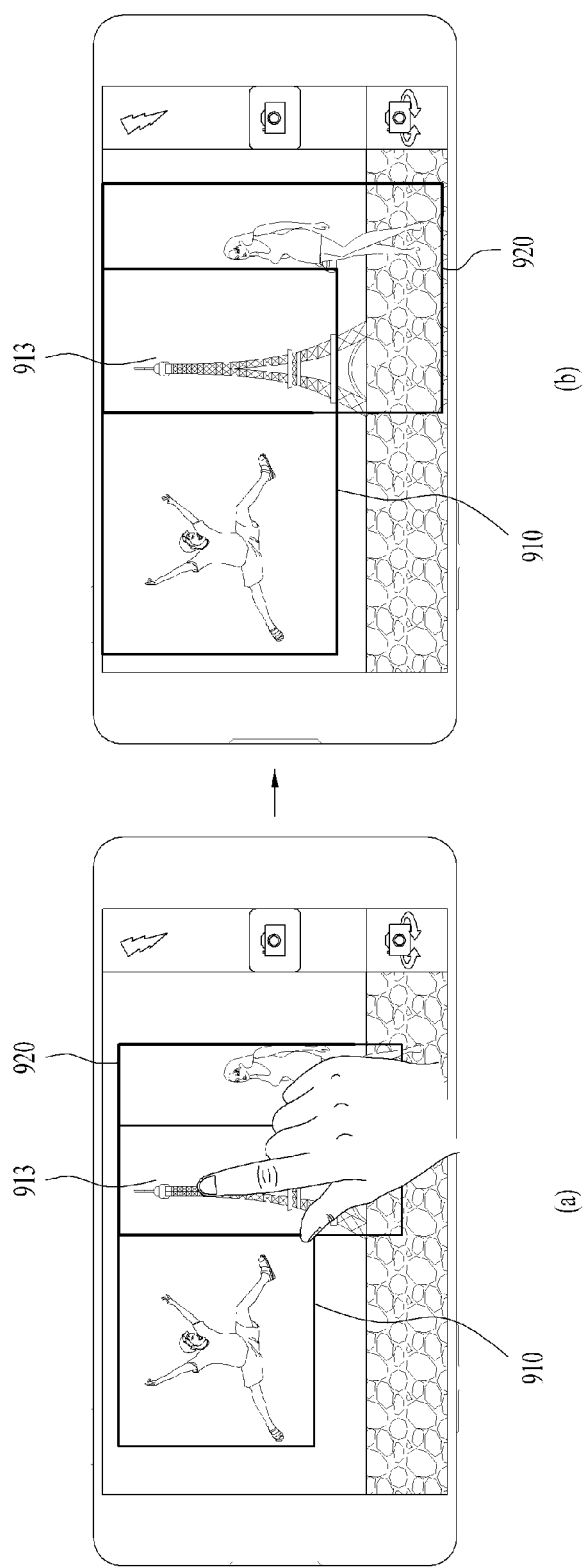
FIG. 9 illustrates an embodiment for simultaneously adjusting the sizes of the first and second frames in the preview interface.

FIG. 9 illustrates an embodiment for simultaneously adjusting the sizes of the first and second frames in the preview interface. As illustrated in FIG. 9(a), the digital device may detect an input signal to a third area 913 included commonly in first and second frames 910 and 920. The digital device may adjust the size of the third area 913 by determining whether the input signal has been generated from a user's pinch-in input or pinch-out input.

As illustrated in FIG. 9(b), the digital device may enlarge the third area 913 by simultaneously enlarging the first and second frames 910 and 920 according to the user's pinch-out input. Or while keeping the sizes of the first and second frames 910 and 920 unchanged, the digital device may simultaneously move the first and second frames 910 and 920 according to the user's pinch-out input in such a manner that the third area 913 is enlarged.

In this manner, the digital device may provide a preview interface so that the user can adjust to-be-captured areas. Therefore, the user can easily adjust the to-be-captured areas.

Upon user completion of adjustment of the to-be-captured areas, the digital device may take pictures of intended areas according to a user input. A plurality of pictures may be captured, as described below in detail with reference to FIG. 10.

Figure 10:
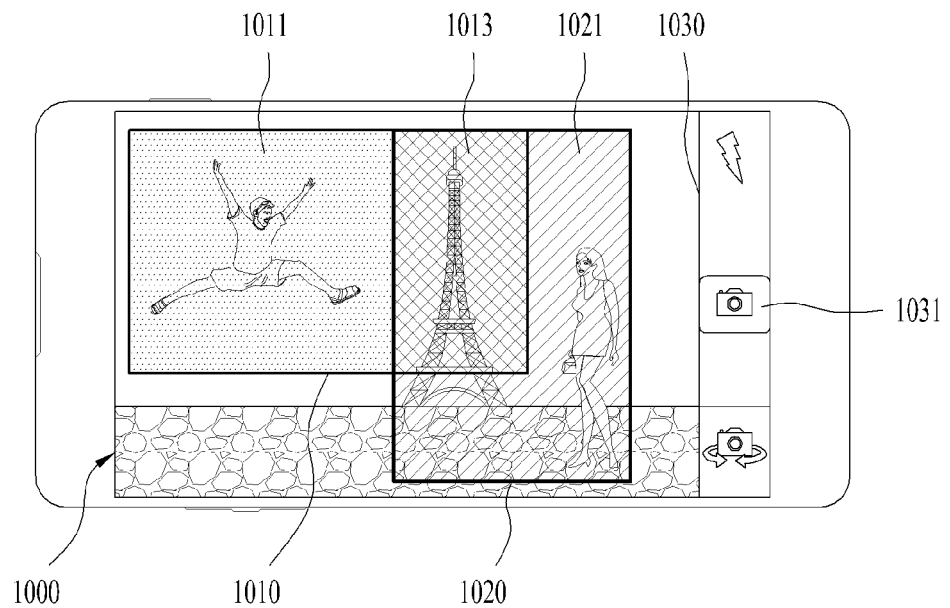
FIG. 10 illustrates an embodiment for providing the first and second frames in the preview interface, for image capturing.

FIG. 10 illustrates an embodiment for providing the first and second frames in the preview interface, for image capturing. Referring to FIG. 10, a preview interface 1000 may include a first frame 1010 and a second frame 1020.

Upon detection of an input signal to a first area 1011 included only in the first frame 1010, the digital device may capture an image (first and third areas 1011 and 1013) included in the first frame 1010 with landscape orientation.

On the other hand, upon detection of an input signal to a second area 1021 included only in the second frame 1020, the digital device may capture an image (the second and third areas 1021 and 1013) included in the second frame 1020 with portrait orientation.

Upon detection of an input signal to the third area 1013 included commonly in the first and second frames 1010 and 1020, the digital device may simultaneously capture the image (the first and third areas 1011 and 1013) included in the first frame 1010 with landscape orientation and the image (the second and third areas 1021 and 1013) included in the second frame 1020 with portrait orientation.

That is, when the digital device detects a user input to the third area 1013, the digital device may capture a landscape-oriented picture and a portrait-oriented picture at the same time based on the first and second frames 1010 and 1020. Accordingly, when the user wants to capture a landscape-oriented picture and a portrait-oriented picture, the user does not need to capture the landscape-oriented picture and then the portrait-oriented picture after rotating the digital device. Instead, the user can capture the landscape-oriented picture and the portrait-oriented picture simultaneously just with one input to the area 1013 overlapped between the first and second frames 1010 and 1020.

As described above, when the user touches an area, the digital device may capture an image included in a frame having the touched area. An input signal for capturing an image may be generated by a hovering input, a voice command, etc. as well as a touch input to a to-be-captured area.

It may be further contemplated as another embodiment that when the user touches at least one of the first, second and third areas 1011, 1021, and 1013, the digital device activates a frame including the touched area. That is, in the case of a touch input to the first area 1011, the digital device may activate the first frame 1010. In the case of a touch input to the second area 1021, the digital device may activate the second frame 1020. In the case of a touch input to the third area 1013, the digital device may activate the first and second frames 1010 and 1020 at the same time. Activation of a frame is equivalent to determination of an area to be captured. Therefore, the digital device may give a graphical effect to the frame that has been activated to be perceived to the user. The graphical effect may be given in various visually perceivable manners such as color changing, frame flickering, etc. Hence, when the user selects a capturing menu 1031 included in a control bar 1030, the digital device may capture an image included in the activated frame.

In this manner, the digital device may recognize a user input to an area only as a signal that selects a frame. Accordingly, upon receipt of a user input to the capturing menu 1031, the digital device may capture the image included in the selected frame.

Upon detection of an input signal to the third area 1013, the digital device may simultaneously capture images included in the first and second frames 1010 and 1020. Herein, the digital device may capture the image of the third area 1013 overlapped between the first and second frames 1010 and 1020 only once.

Figure 11:
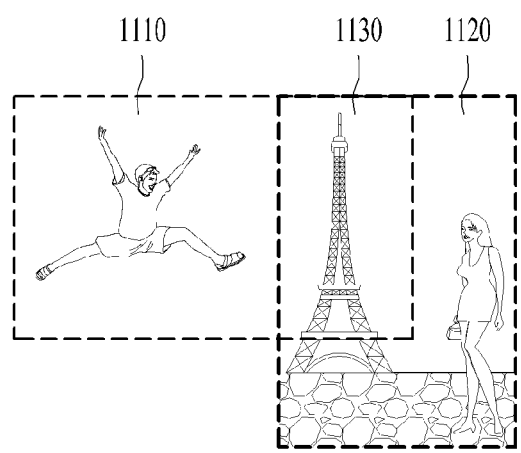
FIG. 11 illustrates an embodiment of an image stored when the digital device simultaneously captures a landscape-oriented picture and a portrait-oriented picture.

FIG. 11 illustrates an embodiment for storing images when the digital device simultaneously captures a landscape-oriented picture and a portrait-oriented picture.

A first area 1110 and a third area 1130 are captured with landscape orientation and a second area 1120 and the third area 1130 are captured with portrait orientation. Thus, when the digital device simultaneously captures a landscape-oriented picture and a portrait-oriented picture, the digital device may capture the common third area 1103 only once.

In other words, the digital device does not capture a landscape-oriented picture and a portrait-oriented picture separately in an embodiment. The digital device may group a first picture captured through the first frame (e.g. a landscape-oriented picture) and a second picture captured through the second frame (e.g. a portrait-oriented picture). The digital device may store the first and second pictures as one image divided into an area common to the first and second pictures and a non-common area, instead of storing the images of the first and second pictures separately.

For example, the digital device may store the images included in the first and second frames as a single image, along with metadata including area identification information that distinguishes the area of the first frame from the area of the second frame. Therefore, the metadata may include information about the coordinates of the area overlapped between the first and second frames.

That is, the digital device may store an image as illustrated in FIG. 11 and information about the coordinates of a common area. Accordingly, when the digital device is to display a landscape-oriented picture, the digital device may extract an area corresponding to the landscape-oriented picture using the information about the coordinates of the common area and display the landscape-oriented picture using the extracted area. When the digital device is to display a portrait-oriented picture, the digital device may extract an area corresponding to the portrait-oriented picture using the information about the coordinates of the common area and display the portrait-oriented picture using the extracted area.

Or the digital device may capture a first image included only in the first frame, a second image included only in the second frame, and a third area included commonly in the first and second frames and may group the first, second and third images. In this case, when the digital device is to display the first picture based on the first frame, the digital device may display the first and third images. When the digital device is to display the second picture based on the second frame, the digital device may display the second and third images.

To display both the first and third images or both the second and third images, the metadata may include information about the coordinates of points at which the images should be combined.

The metadata may include images of fourth areas that are not included in both the first frame and the second frame. Hence, when displaying the landscape-oriented picture captured based on the first frame, the digital device may display a larger image including the first frame. Likewise, when displaying the portrait-oriented picture captured based on the second frame, the digital device may display a larger image including the second frame. The images of the fourth areas are more useful to a digital device having an extendable display area.

As described above, the digital device can prevent unnecessary memory consumption by avoiding redundant storing of the same image.

Figure 12:
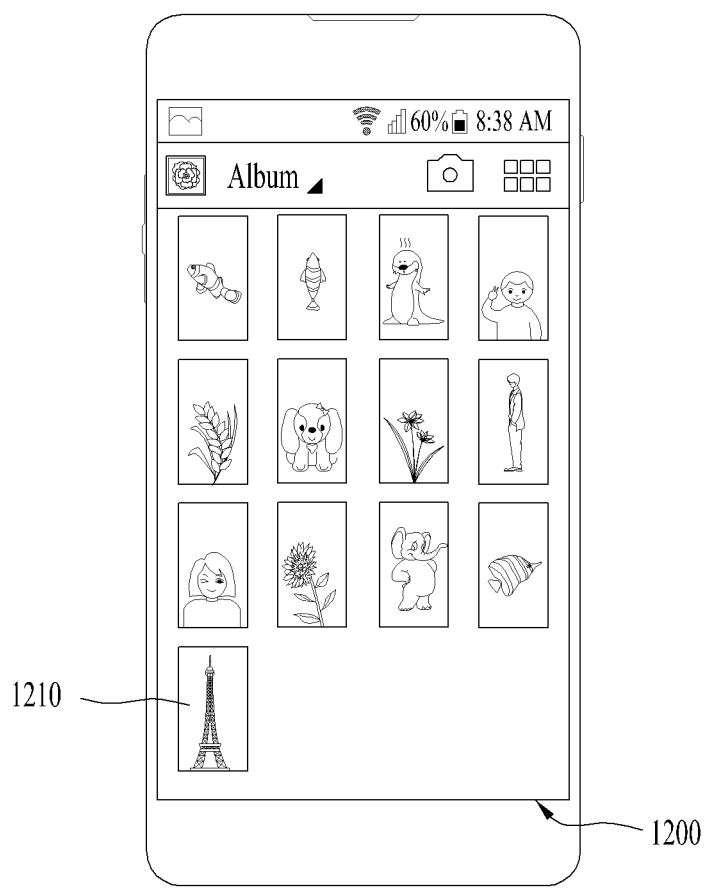
FIG. 12 illustrates an embodiment for providing a picture interface in the digital device.

Meanwhile, the digital device may provide a picture interface that displays a thumbnail for at least one captured picture. FIG. 12 illustrates an embodiment for providing a picture interface in the digital device.

Referring to FIG. 12, a picture interface 1200 may display at least one thumbnail of at least one captured picture. If a first picture captured based on a first frame is grouped with a second picture captured based on a second frame, the picture interface 100 may display only one representative thumbnail for the first and second pictures.

The representative thumbnail may be one of a thumbnail of the first picture, a thumbnail of the second picture, and a thumbnail of an image of an overlapped area between the first and second pictures. In the illustrated case of FIG. 12, the image of the overlapped area between the grouped first and second pictures is displayed as a representative thumbnail 1210.

The grouped first and second pictures are pictures of different areas in an image acquired through the camera unit. The first and second pictures include an area having the same image. When the user simultaneously captures a landscape-oriented picture and a portrait-oriented picture, a symbolic image is included in an overlapped area between first and second frames in many cases. Therefore, the digital device may provide an image of the overlapped area as a representative thumbnail in a picture interface so that the representative thumbnail easily reminds the user of an associated experience.

Upon detection of a user input to a thumbnail displayed in the picture interface, the digital device may display a picture corresponding to the thumbnail. If the thumbnail is a representative thumbnail of grouped pictures, the digital device may select a specific picture from among the grouped pictures and display the selected picture according to its mode. That is, upon detection of a user input to a representative thumbnail, the digital device may select one of grouped first and second pictures and display the selected picture.

For example, upon detection of a user input to a representative thumbnail, the digital device may display a landscape-oriented picture selected from grouped pictures if it is in landscape mode. If it is in portrait mode, the digital device may display a portrait-oriented picture selected from the grouped pictures. Accordingly, the digital device may provide an environment in which the aspect ratio of a picture is approximate to that of a display area of the digital device. That is, the digital device may provide a display environment matching a picture.

Figure 13:
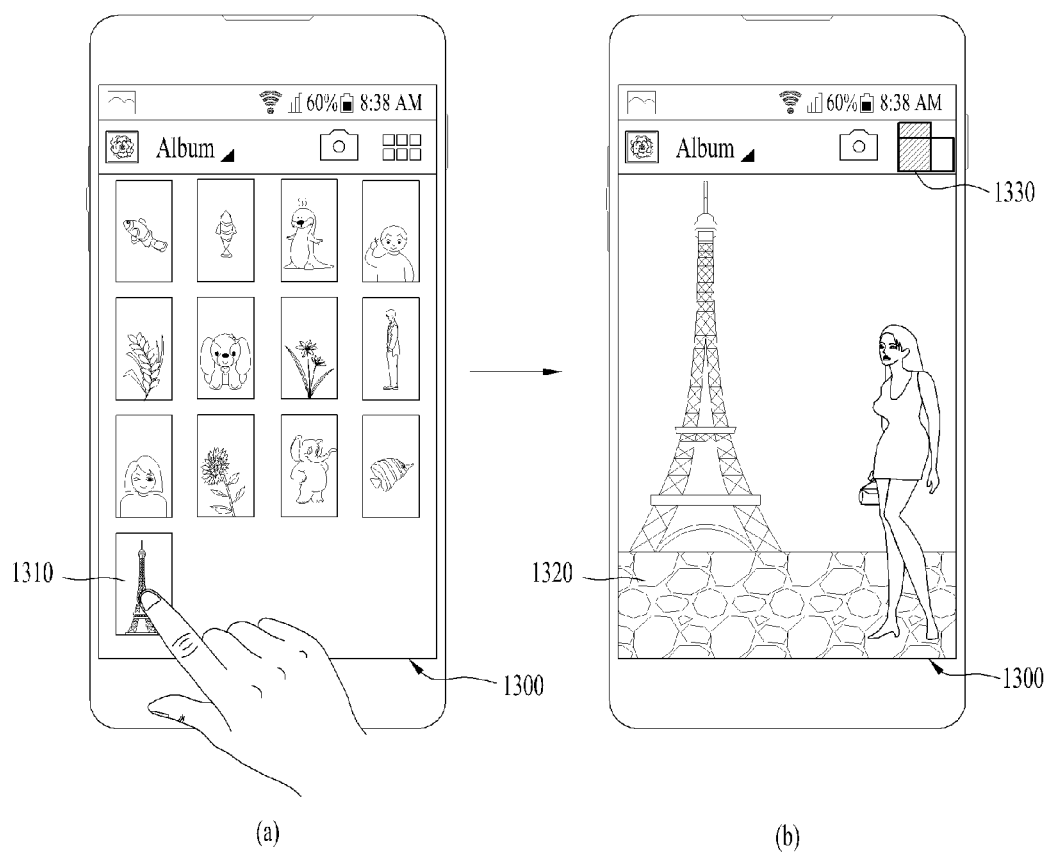
FIG. 13 illustrates an embodiment for displaying a portrait-oriented picture in the picture interface.

FIG. 13 illustrates an embodiment for displaying a portrait-oriented picture in the picture interface.

As illustrated in FIG. 13(a), a picture interface 1300 may display thumbnails of captured images in the digital device. The displayed thumbnails may include a representative thumbnail 1310 of grouped pictures.

Upon detection of a user input to the representative thumbnail 1310, the digital device may display a picture corresponding to the representative thumbnail 1310 as illustrated in FIG. 13(b). Since the digital device is placed in the portrait mode, the digital device may display a portrait-oriented picture 1320 from among grouped pictures.

However, the user may not know that the displayed picture is from a group of pictures. Thus, the picture interface 1300 may further display a graphic object 1330 indicating whether the displayed picture 1320 is from a group and whether the displayed picture 1320 is a landscape-oriented or portrait-oriented picture.

The graphic object 1330 may take a form obtained by overlapping a first rectangle with a latitudinal length greater than a longitudinal length with a second rectangle with a longitudinal length greater than a latitudinal length. If the current displayed picture is a landscape-oriented picture, the digital device may give a graphical effect to the first rectangle and if the current displayed picture is a portrait-oriented picture, the digital device may give the graphical effect to the second rectangle. Consequently, the user can identify simply from the graphic object 1330 whether the current displayed picture is one of grouped pictures and whether it is landscape-oriented or portrait-oriented.

Upon detection of a user input to the graphic object 1330, the digital device may switch the displayed picture to another picture of the same group. For example, when the digital device detects a user input to the graphic object 1330, the digital device may replace the portrait-oriented picture 1320 with a landscape-oriented picture of the same group. As the digital device changes the picture, it may change the graphical effect of the graphic object 1330.

Figure 14:
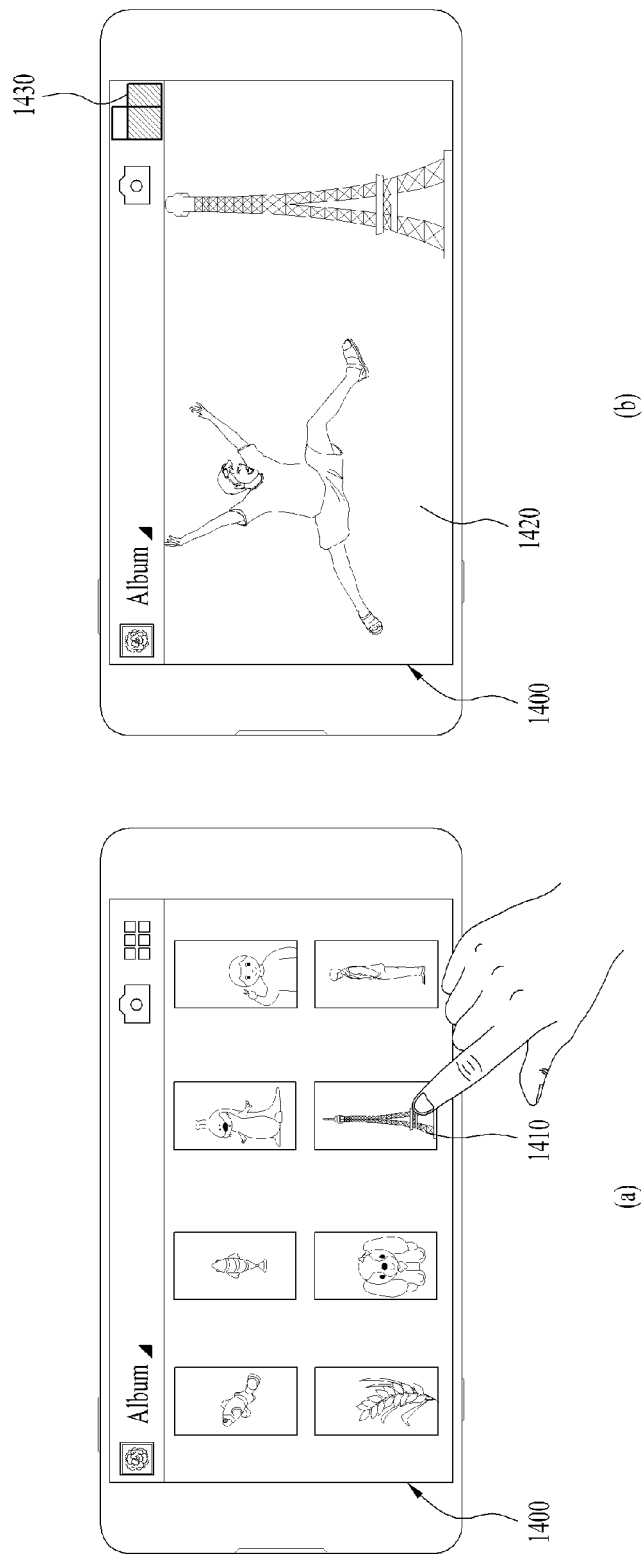
FIG. 14 illustrates an embodiment for displaying a landscape-oriented picture in the picture interface.

FIG. 14 illustrates an embodiment for displaying a landscape-oriented picture in the picture interface.

As illustrated in FIG. 14(a), a picture interface 1400 may display thumbnails of captured images in the digital device. The displayed thumbnails may include a representative thumbnail 1410 of grouped pictures.

Upon detection of a user input to the representative thumbnail 1410, the digital device may display a picture corresponding to the representative thumbnail 1410 as illustrated in FIG. 14(b). Since the digital device is placed in the landscape mode, the digital device may display a landscape-oriented picture 1420 from among the grouped pictures.

The picture interface 1400 may further display a graphic object 1430 indicating whether the displayed picture 1420 is from a group and whether the displayed picture 1420 is a landscape-oriented or portrait-oriented picture. The graphic object 1430 is identical to the graphic object 1330 illustrated in FIG. 13.

Upon detection of a user input to the graphic object 1430, the digital device may switch the displayed picture to another picture of the same group. For example, when the digital device detects a user input to the graphic object 1430, the digital device may replace the landscape-oriented picture 1420 with a portrait-oriented picture of the same group.

However, if the displayed picture is replaced with another picture without changing the mode of the display device as illustrated in FIGS. 13(b) and 14(b), the aspect ratio of the picture may not match the screen of the digital device and thus may be scaled down.

Figure 15:
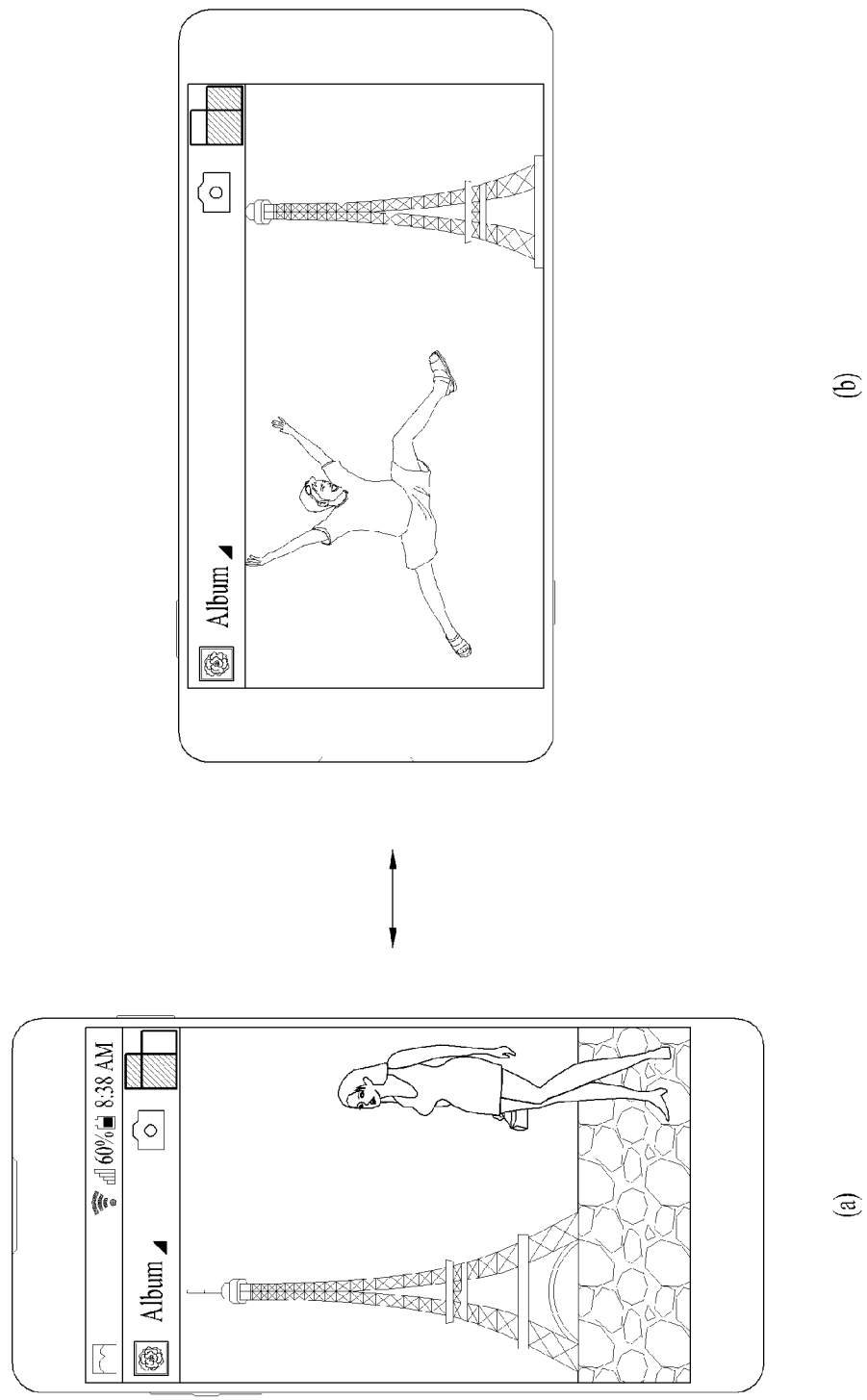
FIG. 15 illustrates an embodiment for switching between a landscape-oriented picture and a portrait-oriented picture of the same group in the picture interface.

Therefore, the digital device may change a displayed picture according to its mode (landscape mode or portrait mode). FIG. 15 illustrates an embodiment for switching between a portrait-oriented picture and a landscape-oriented picture in the picture interface.

As illustrated in FIG. 15(a), the portrait-mode digital device may display a portrait-oriented picture matching the portrait mode from among grouped pictures. The digital device may detect a mode switching signal, like sensing its rotation through the sensor unit. Upon detection of the mode switching signal, the digital device may replace the displayed portrait-oriented picture with a landscape-oriented picture of the same group as illustrated in FIG. 15(b). In addition, upon detection of a mode switching signal in the landscape mode as illustrated in FIG. 15(b), the digital device may switch to the landscape-oriented picture as illustrated in FIG. 15(a).

Since the digital device displays a picture matching to its mode from among the pictures of the same group as described above, the digital device can provide an environment in which the user views a picture under an optimized display condition.

Meanwhile, the digital device may include a flexible display. Then the digital device may provide first and second modes. The display area is scaled down in the first mode and scaled up in the second mode.

Figure 16:
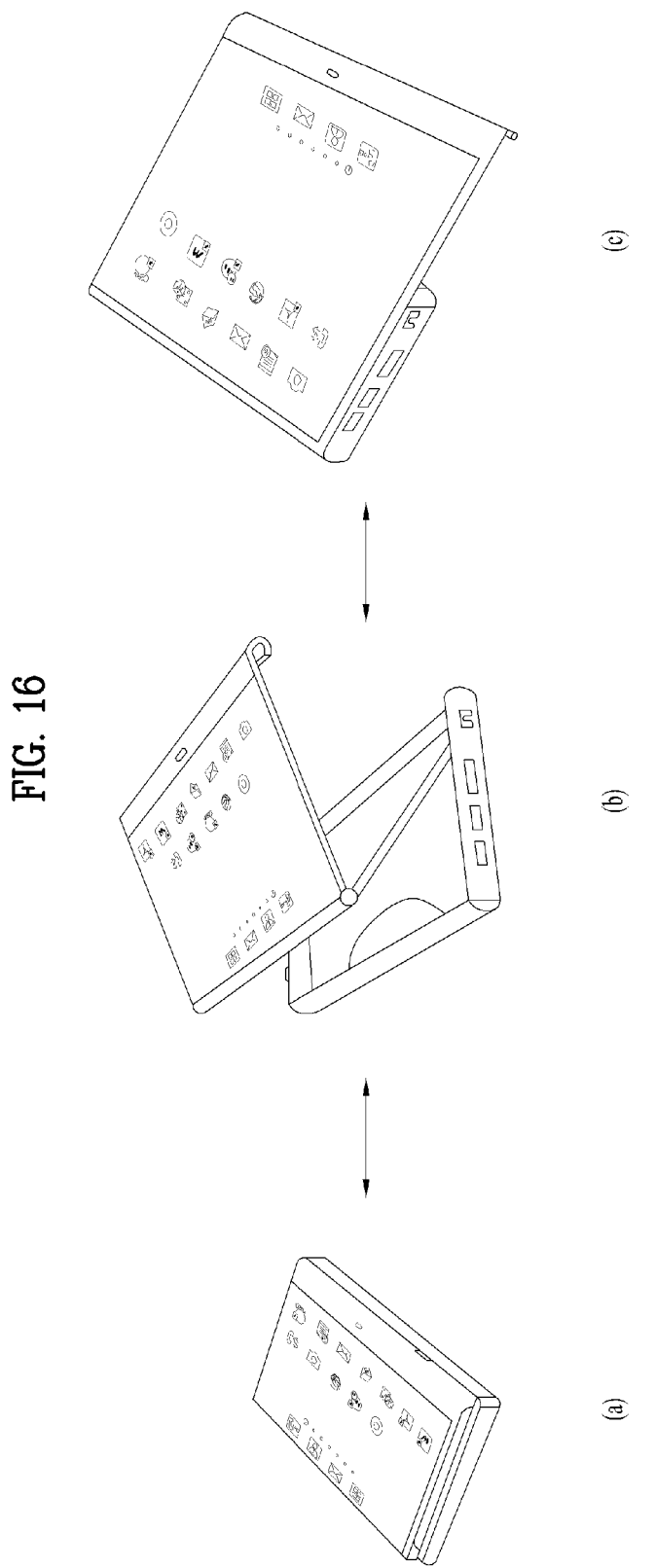
FIG. 16 illustrates an embodiment of first and second modes, when the digital device includes a flexible display.

FIG. 16 illustrates an embodiment of the first and second modes, when the digital device includes a flexible display.

The flexible display can be bent, curved, or rolled without damage owing to a thin flexible substrate. Thus, the digital device may operate in the first mode in which the display device is folded and thus the display area is scaled down in size. The digital device may also be unfolded as illustrated in FIG. 16(b). The digital device may operate in the second mode in which the flexible display is fully unfolded and thus the display area is scaled up to a maximum size, as illustrated in FIG. 16(c).

Figure 17:
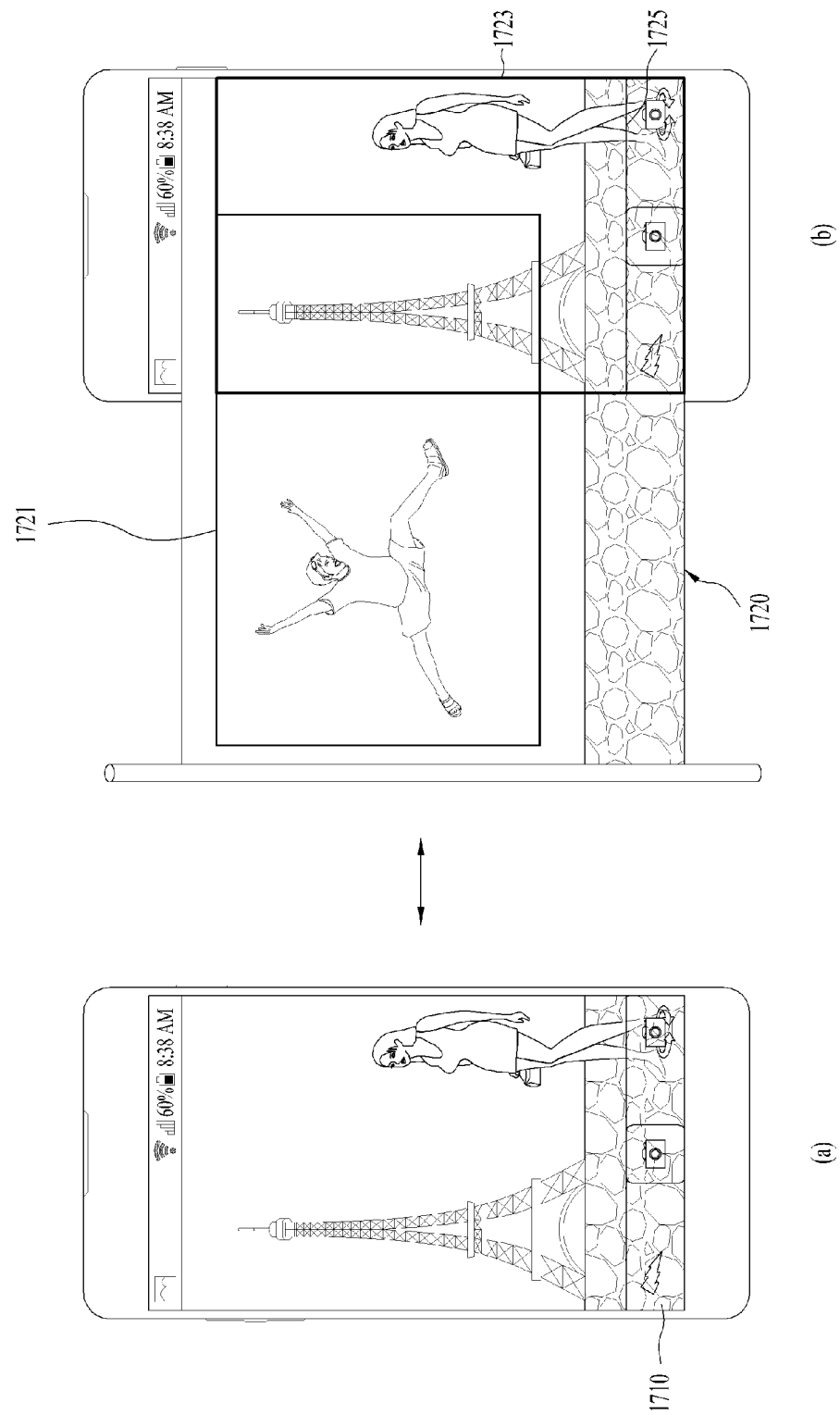
FIG. 17 illustrates an embodiment for providing a preview interface in the second mode in the digital device.

FIG. 17 illustrates an embodiment for providing a preview interface in the second mode in the digital device.

If the user wants to capture an image using the digital device, the digital device may provide a control bar 1710 in the first mode, as illustrated in FIG. 17(a). Hence, when the user applies a capturing input to the control bar 1710, the digital device may take a picture of a current displayed image.

As illustrated in FIG. 17(b), the digital device may provide a preview interface 1720 in the second mode. The preview interface 1720 may indicate to-be-captured areas in a displayed image. The preview interface 1720 may include a first frame 1721 indicating a preview area of a first picture and a second frame 1723 indicating a preview area of a second picture. The preview interface 1720 may further include a control bar 1725. As described before, the user may move the control bar 1725 to an intended position.

The digital device has a larger display area in the second mode than in the first mode. Thus, the digital device can increase user convenience by providing the preview interface 1720 that allows the user to simultaneously capture a landscape-oriented picture and a portrait-oriented picture. Further, the digital device may adjust the sizes of the first and second frames according to the second-mode display area.

Unlike FIG. 17, the digital device may provide a preview interface in the first mode. If the digital device switches from the first mode to the second mode, the digital device may provide an extended preview interface in correspondence with an extended display area in the second mode. In addition, the digital device may adjust the sizes of the first and second frames included in the preview interface in correspondence with the extended display area.

Figure 18:
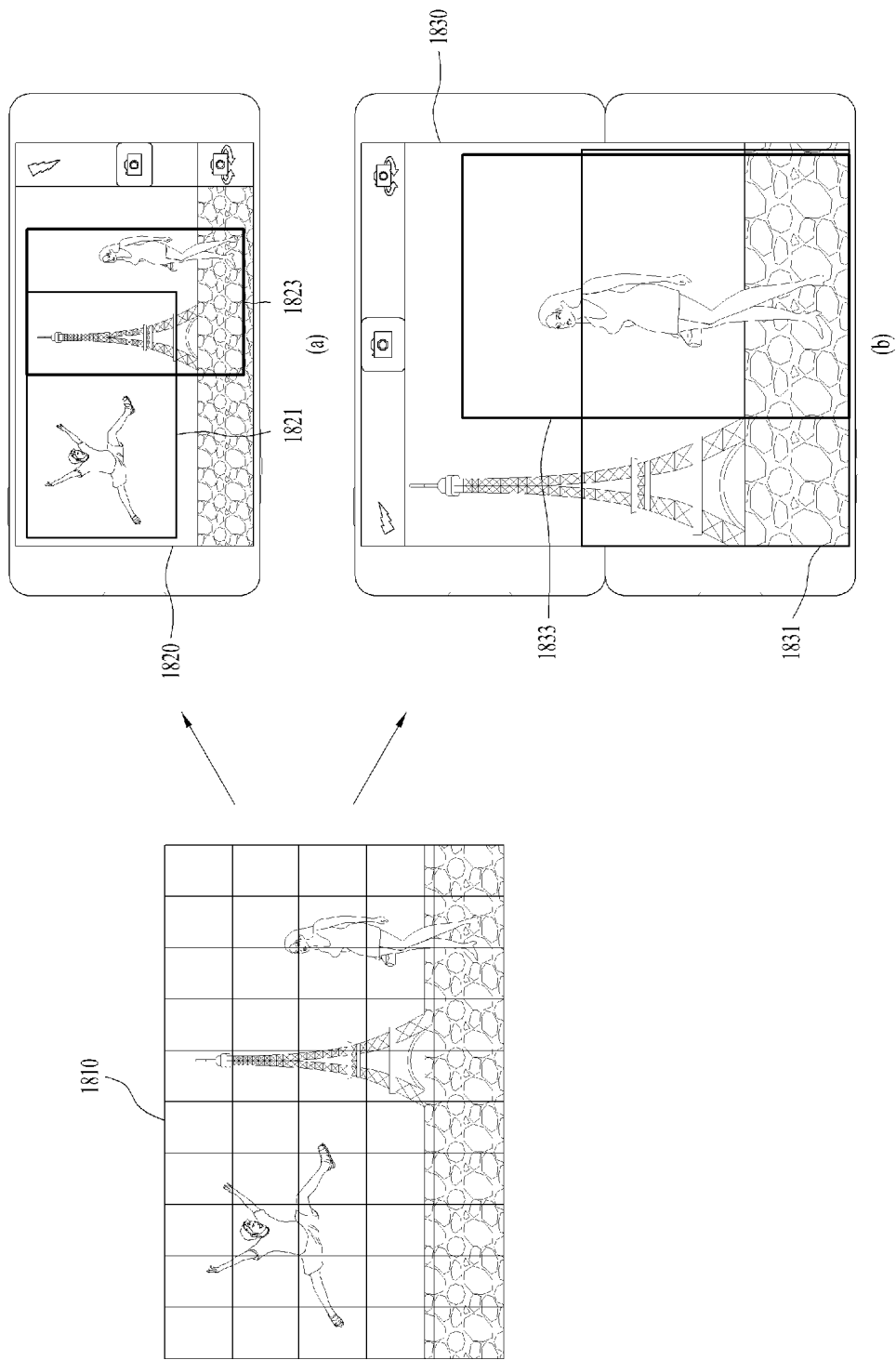
FIG. 18 illustrates an embodiment for grouping images according to the aspect ratios of display areas in the digital device.

FIG. 18 illustrates an embodiment for grouping images according to the aspect ratio of a display area in the digital device.

The image sensor of the camera unit may sense an image 1810 in the digital device. It is assumed that the sensed image 1810 is shaped into a rectangle with a latitudinal length longer than a vertical length.

As illustrated in FIG. 18(a), the display area of the digital device has a latitudinal length larger than a longitudinal length in the first mode. Thus, a preview interface may display the full sensed image 1810 and provide first and second frames 1821 and 1823 in the first-mode digital device. That is, because the aspect ratio of the display area of the first-mode digital device is approximate to that of the sensed image 1810, it may be appropriate for the first-mode digital device to display the full sensed image 1810.

On the other hand, the display area of the second-mode digital device may have latitudinal and longitudinal lengths that are approximate to each other, as illustrated in FIG. 18(b). Thus, the second-mode digital device may crop the sensed image 1810 according to the aspect ratio of the display area. Accordingly, the preview interface 1830 may display the cropped image and first and second frames 1831 and 1833 enlarged in correspondence with the extended display area.

In this manner, the digital device may crop a sensed image according to the aspect ratio of its display area. Therefore, the digital device may eliminate picture scale-down or an unused display area.

However, in the second mode of the digital device, the user may want to view a sensed image fully although the image is scaled down, rather than the sensed image is cropped as illustrated in FIG. 18(b). In this case, the digital device may display the image 1810 acquired through the camera unit at the aspect ratio of the image 1810, upon user request. Herein, the digital device may give a graphical effect to an unused display area resulting from an aspect ratio mismatch between the image and the display area. The graphical effect may include a panorama effect.

Figure 19:
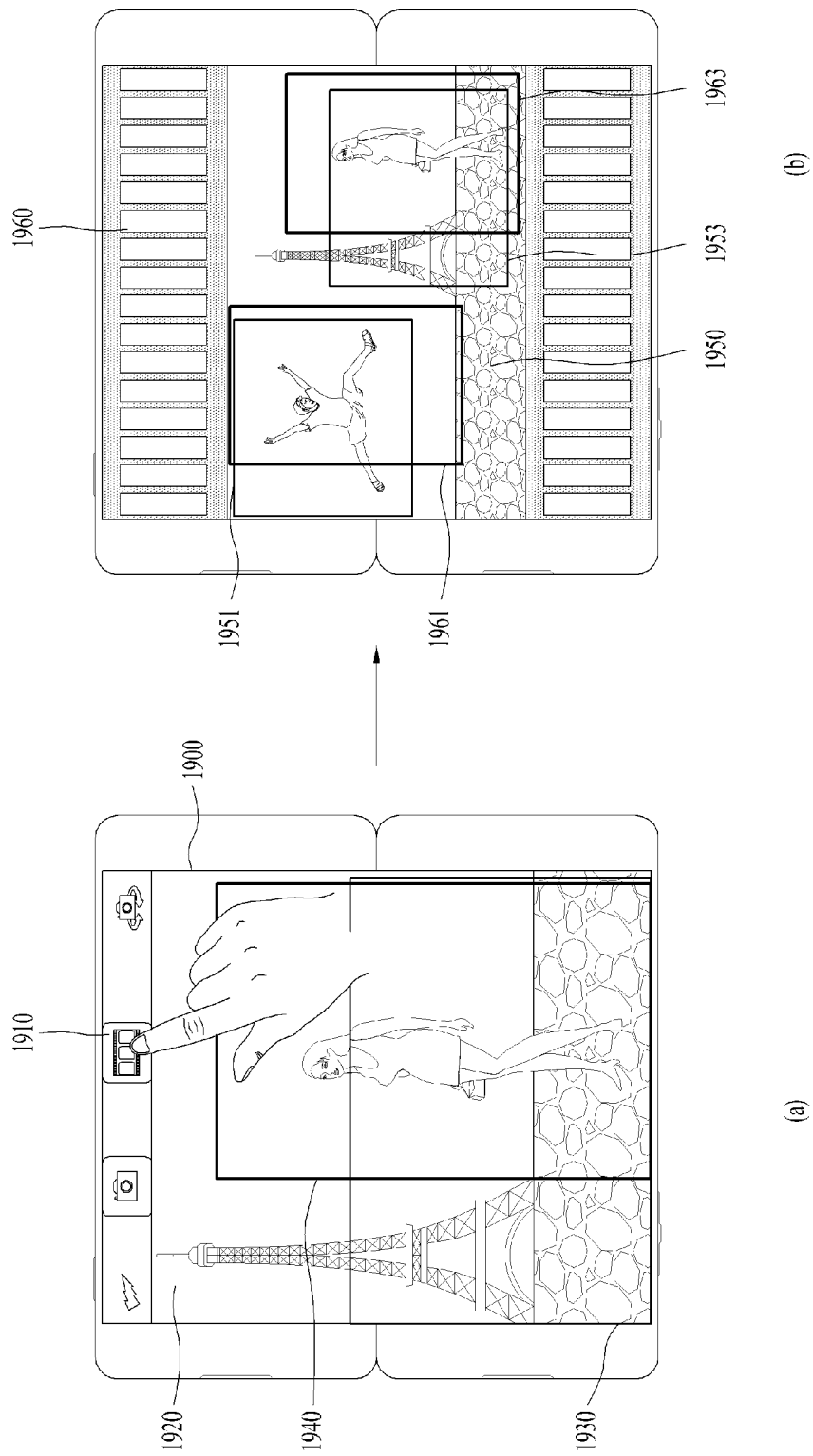
FIG. 19 illustrates an embodiment for displaying images in a panorama in the digital device.

FIG. 19 illustrates an embodiment for displaying images in a panorama in the digital device.

FIG. 19(a) illustrates an embodiment for displaying a sensed image by cropping the sensed image according to the aspect ratio of a display area in the display device, as illustrated in FIG. 18(b). When a preview interface 1900 displays a cropped image 1920, it may provide a user menu 1910 that allows the user to view the full image.

As illustrated in FIG. 19(a), the digital device may detect an input signal to the user menu 1910 for a full view of an image. Then the digital device may display a full image 1950 acquired through the camera unit as scaled-down and may give a graphical effect 1960 reminding of a panorama picture in an area in which the image 1950 is not displayed.

The preview interface 1900 of the first-mode digital device may include first and second frames 1930 and 1940, whereas a preview interface of the second-mode digital device may include a plurality of first frames 1951 and 1953 and a plurality of second frames 1961 and 1963.

Therefore, when the user simultaneously touches a common area between the first and second frames 1951 and 1961 and a common area between the first and second frames 1953 and 1963, the digital device may simultaneously capture a landscape-oriented picture and a portrait-oriented picture included in each frame and may group the captured pictures. That is, the digital device may simultaneously capture a total of four pictures in a group.

As described above, the number of frames included in a preview interface may not be limited in the digital device in an embodiment. The digital device may simultaneously capture a plurality of pictures according to the number of frames and an area in which a user input is detected.

Figure 20:
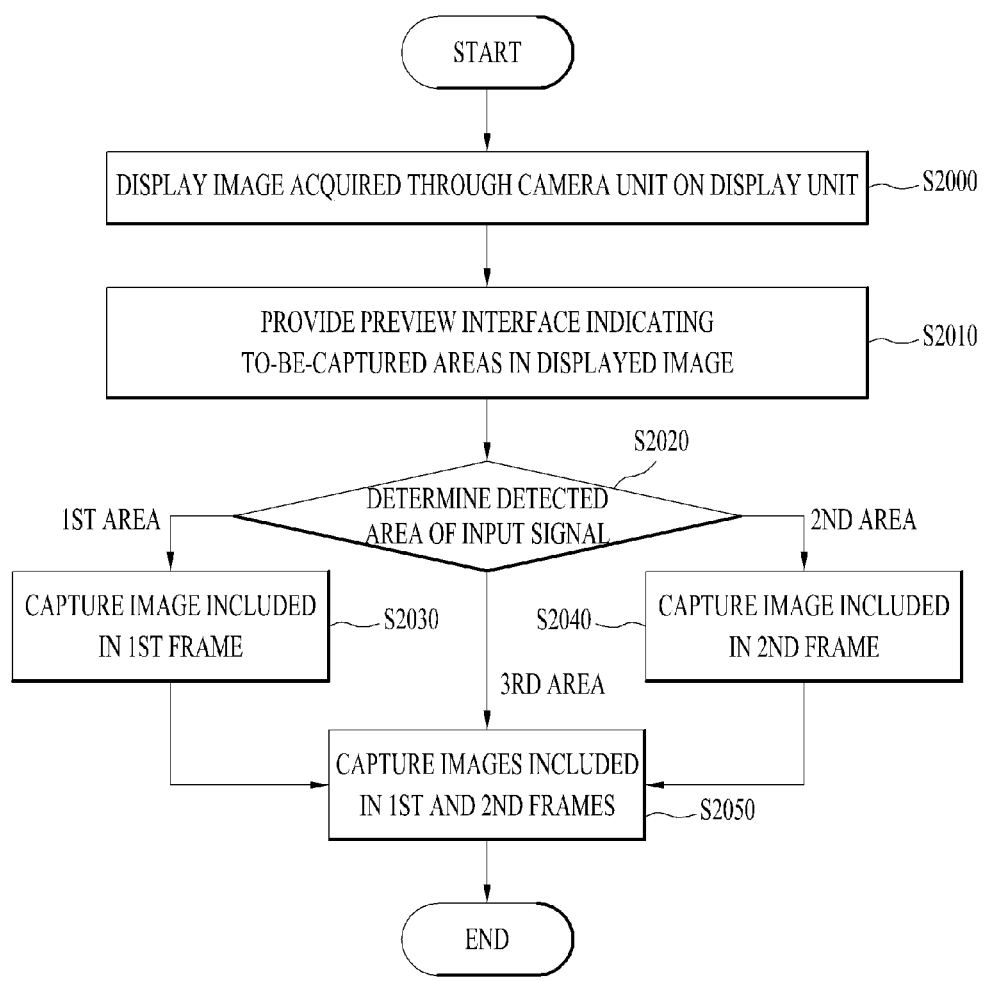
FIG. 20 is a flowchart illustrating a method for controlling the digital device according to an embodiment.

FIG. 20 is a flowchart illustrating a method for controlling the digital device according to an embodiment.

Referring to FIG. 20, the digital device may display an image acquired through the camera unit on the display unit (S2000). As described before with reference to FIG. 2, the digital device may provide a preview interface indicating to-be-captured areas in the displayed image (S2010).

As described before with reference to FIG. 10, the digital device may determine an area in which an input signal is detected (S2020).

If the detected area of the input signal is a first area included only in a first frame, the digital device may capture an image included in the first frame (S2030). If the detected area of the input signal is a second area included only in a second frame, the digital device may capture an image included in the second frame (S2040). If the detected area of the input signal is a third area included commonly in the first and second frames, the digital device may capture the images included in the first and second frames (S2050).

As described before with reference to FIG. 11, the digital device may group the simultaneously captured first and second pictures based on the first and second frames into one group.

FIG. 21 is a flowchart illustrating a method for controlling the digital device according to another embodiment.

Referring to FIG. 21, the digital device may display an image acquired through the camera unit on the display unit (S2100). As described before with reference to FIG. 2, the digital device may provide a preview interface indicating to-be-captured areas in the displayed image (S2110).

The digital device may detect various input signals. Thus, the digital device may determine the type of a detected input signal (S2120).

If the detected input signal is a first signal, the digital device may move at least one of first and second frames based on directional information included in the first signal according to a detected area of the first signal, as described before with reference to FIGS. 3 to 6 (S2130). The first signal may be generated by a user's drag input, gesture input, long touch and pinch input, etc.

If the detected input signal is a second signal, the digital device may adjust the size of at least one of the first and second frames according to a detected area of the second signal, as described before with reference to FIGS. 7, 8 and 9 (S2140). The second signal may be generated by a pinch-in or pinch-output input made with a user's two fingers.

If the detected input signal is a third signal, the digital device may capture at least one image included in the first and second frames according to a detected area of the third signal, as described with reference to FIGS. 10 and 11 (S2150). The third signal may be generated by a user's touch input, voice command, etc.

In particular, when the digital device detects the third signal in an overlapped area between the first and second frames, the digital device may simultaneously capture an image included in the first frame and an image included in the second frame.

As is apparent from the above description, a user can capture a landscape-oriented picture and a portrait-oriented picture simultaneously with one input in an embodiment. Therefore, the user can capture a plurality of pictures conveniently.

In another embodiment, the user can easily set areas for simultaneous capturing of a plurality of pictures through a preview interface indicating to-be-captured areas.

In another embodiment, the user can easily adjust to-be-captured areas through a preview interface. Particularly, the user can simultaneously adjust two areas to be captured with landscape orientation and portrait orientation just through one action.

In another embodiment, when the digital device simultaneously captures a landscape-oriented picture and a portrait-oriented picture, the digital device can store an image of an overlapped area between the landscape-oriented picture and the portrait-oriented picture only once. Therefore, the digital device can prevent unnecessary memory consumption.

In another embodiment, when the digital device simultaneously captures a landscape-oriented picture and a portrait-oriented picture, the digital device can group the landscape-oriented picture and the portrait-oriented picture into one group. In addition, the digital device can display only a representative thumbnail for the grouped pictures. Upon user request, the display device can display a picture of the group. Accordingly, the user can easily find an intended picture and an associated picture simply by viewing the representative thumbnail.

In a further embodiment, when the display device is in landscape mode, it can display a landscape-oriented picture from among grouped pictures and when the display device is in portrait mode, it can display a portrait-oriented picture from among the grouped pictures. Thus, the digital device can display a picture having a similar aspect ratio to that of its mode. Consequently, the problem of picture scale-down according to a mode of the digital device can be solved and the user can view a picture in a display environment matching the picture.

While the disclosure has been described with reference to separate drawings for convenience's sake, a new embodiment may be implemented by embodiments described in the drawings. When needed, designing a recording medium readable by a computer to which a program for implementing the afore-described embodiments of the disclosure is written may fall within the scope of the disclosure.

The digital device and the method for controlling the same according to the embodiments are not limited to the above-described embodiments. The whole or part of each embodiment may be selectively combined with that of another embodiment so as to make various modifications to the embodiments.

The method for controlling the digital device according to the foregoing embodiments may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the disclosure has been particularly shown and described with reference to exemplary embodiments thereof, it will be understood by those of ordinary skill in the art that various changes in form and details may be made therein without departing from the spirit and scope of the disclosure as defined by the following claims.

Both a device and a method are described in the disclosure and when needed, their descriptions are applicable complementarily.

What is claimed is:

1. A digital device comprising:
   a sensor unit configured to sense a user input to the digital device and to provide a signal corresponding to a sensed result to a processor;
   a camera unit configured to acquire an image;
   a display unit configured to display the acquired image; and
   the processor configured to control the sensor unit, the camera unit, and the display unit,
   wherein the processor is further configured to:
   display the image acquired through the camera unit on the display unit,
   provide a preview interface indicating a to-be-captured area in the displayed image, wherein the preview interface includes a first frame indicating a preview area of a first picture and a second frame indicating a preview area of a second picture,
   capture an image included in the first frame, when a first input signal to a first area included in the first frame is detected,
   capture an image included in the second frame, when a second input signal to a second area included in the second frame is detected,
   simultaneously capture the images included in the first and second frames, when a third input signal to a third area overlapped between the first and second frames is detected, and
   move at least one of the first and second frames according to a detected area of a fourth input signal, when the fourth input signal is detected.

2. The digital device according to claim 1, wherein the first picture includes a landscape-oriented picture and the second picture includes a portrait-oriented picture.

3. The digital device according to claim 1, wherein the processor simultaneously moves the first and second frames, when the fourth input signal to the third area is detected.

4. The digital device according to claim 1, wherein the processor adjusts a size of at least one of the first and second frames according to a detected area of a fifth input signal, when the fifth input signal is detected.

5. The digital device according to claim 4, wherein the processor simultaneously adjusts the sizes of the first and second frames, when the fifth input signal to the third area is detected.

6. The digital device according to claim 4, wherein if the processor adjusts the size of at least one of the first and second frames, the processor maintains aspect ratios of the first and second frames.

7. The digital device according to claim 1, wherein if the processor simultaneously captures the images included in the first and second frames, the processor captures the third area that is overlapped between the first and second frames only once.

8. The digital device according to claim 1, wherein if the processor simultaneously captures the images included in the first and second frames, the processor groups the first picture captured through the first frame and the second picture captured through the second frame.

9. The digital device according to claim 8, wherein the processor stores metadata about the grouped first and second pictures.

10. The digital device according to claim 9, wherein the metadata includes information about the coordinates of the third area overlapped between the first and second frames.

11. The digital device according to claim 9, wherein the metadata includes an image of the third area overlapped between the first and second frames.

12. The digital device according to claim 9, wherein the metadata includes an image of a fourth area not included in both the first frame and the second frame in the displayed image.

13. The digital device according to claim 8, wherein the processor provides a picture interface displaying a thumbnail for at least one captured picture, wherein the picture interface displays one representative thumbnail of the grouped first and second pictures.

14. The digital device according to claim 13, wherein the representative thumbnail includes one of a thumbnail of the first picture, a thumbnail of the second picture, and a thumbnail of an image of the third area overlapped between the first and second pictures.

15. The digital device according to claim 13, wherein the processor displays the first picture if the digital device is in landscape mode and displays the second picture if the digital device is in portrait mode, when a sixth input signal to the representative thumbnail is detected.

16. The digital device according to claim 15, wherein if the first or second picture is displayed according to the sixth input signal, the picture interface includes a graphic object indicating whether the displayed picture is a grouped picture and whether the displayed picture is a landscape-oriented picture or a portrait-oriented picture.

17. The digital device according to claim 16, wherein the processor replaces a displayed portrait-oriented picture with a landscape-oriented picture of a same group or to replace a displayed landscape-oriented picture with a portrait-oriented picture of the same group, when a seventh input signal to the graphic object is detected.

18. The digital device according to claim 16, wherein the processor replaces a displayed portrait-oriented picture with a landscape-oriented picture of a same group or to replace a displayed landscape-oriented picture with a portrait-oriented picture of the same group, when a signal for switching between landscape mode and portrait mode is detected.

19. The digital device according to claim 1, wherein if the digital device includes a flexible display, the processor provides a first mode having a reduced display area of the flexible display and a second mode having an increased display area of the flexible display.

20. The digital device according to claim 19, wherein if the digital device is in the second mode, the processor provides the preview interface.

21. The digital device according to claim 19, wherein the processor adjusts sizes of the first and second frames according to a size of the increased display area, when a signal indicating that the digital device enters into the second mode from the first mode is detected.

22. The digital device according to claim 19, wherein if the digital device is in the second mode, the processor crops the image acquired through the camera unit according to the aspect ratio of the increased display area in the second mode.

23. The digital device according to claim 19, wherein the processor displays the image acquired through the camera unit at the aspect ratio of the acquired image and gives a graphical effect to an area in which the acquired image is not displayed, when an eighth input signal to the preview interface of the digital device in the second mode is detected.

24. A method for controlling a digital device, the method comprising:
- displaying an image acquired through a camera unit;
- providing a preview interface indicating a to-be-captured area in the displayed image, wherein the preview interface includes a first frame indicating a preview area of a first picture and a second frame indicating a preview area of a second picture;
- moving at least one of the first and second frames according to a detected area of a first input signal, when the first input signal is detected, wherein the detected area of the first input signal is one of a first area included in the first frame, a second area included in the second frame, and a third area overlapped between the first and second frames;
- capturing an image included in the first frame, when a second input signal to the first area is detected;
- capturing an image included in the second frame, when a third input signal to the second area is detected; and
- simultaneously capturing the images included in the first and second frames, when a fourth input signal to the third area is detected.

* * * * *